(12) United States Patent
Yoon et al.

(10) Patent No.: US 9,993,806 B2
(45) Date of Patent: Jun. 12, 2018

(54) CATALYST FOR DEHYDROGENATION REACTION OF FORMIC ACID AND METHOD FOR PREPARING THE SAME

(71) Applicant: KOREA INSTITUTE OF SCIENCE AND TECHNOLOGY, Seoul (KR)

(72) Inventors: Chang Won Yoon, Seoul (KR); Yeong Cheon Kim, Seoul (KR); Hyun Seo Park, Seoul (KR); Hyung Chul Ham, Seoul (KR); Sung Pil Yoon, Seoul (KR); Jonghee Han, Seoul (KR); Suk Woo Nam, Seoul (KR); Seong Cheol Jang, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 0 days. days.

(21) Appl. No.: 15/708,132

(22) Filed: Sep. 19, 2017

(65) Prior Publication Data

US 2018/0078925 A1 Mar. 22, 2018

(30) Foreign Application Priority Data

Sep. 19, 2016 (KR) ........................ 10-2016-0119407

(51) Int. Cl.
*B01J 21/18* (2006.01)
*B01J 23/44* (2006.01)
(Continued)

(52) U.S. Cl.
CPC ............. *B01J 23/892* (2013.01); *B01J 27/24* (2013.01); *B01J 35/0006* (2013.01);
(Continued)

(58) Field of Classification Search
CPC . B01J 21/18; B01J 21/185; B01J 23/44; B01J 23/755; B01J 23/892; B01J 27/20;
(Continued)

(56) References Cited

U.S. PATENT DOCUMENTS 3,953,345 A * 4/1976 Saito ........................ B01J 21/18
210/660
5,240,893 A * 8/1993 Witherspoon ......... B01J 37/084
204/294

(Continued)

FOREIGN PATENT DOCUMENTS

CN 10-4617306 * 5/2015 ............. H01M 4/86
KR 100818262 B1 4/2008
(Continued)

OTHER PUBLICATIONS

Tanmay Bhowmik et al., "Highly efficient electrocatalytic oxidation of formic acid on palladium nanoparticles-graphtic carbon nitride composite." International Journal of Hydrogen Energy 42, pp. 212-217 (Year: 2017).*

(Continued)

*Primary Examiner* — Patricia L. Hailey
(74) *Attorney, Agent, or Firm* — Cantor Colburn LLP

(57) ABSTRACT

Provided is a method for preparing a catalyst for a dehydrogenation reaction of formic acid, the method including: preparing a nitrogen-doped carbon support; forming a mixed solution including a first aqueous metal precursor solution which includes palladium (Pd) and a second aqueous metal precursor solution which includes nickel (Ni); and forming a catalyst for a dehydrogenation reaction of formic acid by stirring the nitrogen-doped carbon support with the mixed solution, and then immobilizing alloy particles of Pd and Ni on the nitrogen-doped carbon support.

10 Claims, 19 Drawing Sheets

(51) Int. Cl.
| | |
|---|---|
| B01J 23/755 | (2006.01) |
| B01J 23/89 | (2006.01) |
| B01J 27/24 | (2006.01) |
| B01J 35/00 | (2006.01) |
| B01J 37/02 | (2006.01) |
| B01J 37/08 | (2006.01) |
| C01B 3/22 | (2006.01) |

(52) U.S. Cl.
CPC ....... *B01J 35/0013* (2013.01); *B01J 37/0215* (2013.01); *B01J 37/084* (2013.01); *B01J 37/088* (2013.01); *C01B 3/22* (2013.01); *C01B 2203/0277* (2013.01); *C01B 2203/1064* (2013.01); *C01B 2203/1082* (2013.01)

(58) Field of Classification Search
CPC .... B01J 27/24; B01J 35/0006; B01J 35/0013; B01J 37/0215; B01J 37/084; B01J 37/088; C01B 3/22; C01B 2203/0277; C01B 2203/1064; C01B 2203/1082
USPC .................. 502/185, 200, 326; 420/456, 463
See application file for complete search history.

(56) References Cited

U.S. PATENT DOCUMENTS

| | | | |
|---|---|---|---|
| 9,174,205 B2 * | 11/2015 | Reimerink-Schats | ... B01J 21/18 |
| 9,700,877 B2 * | 7/2017 | Kim | ........................ B01J 35/026 |
| 2008/0219918 A1 | 9/2008 | Lee et al. | |
| 2013/0157838 A1 * | 6/2013 | Viswanathan | ........... B01J 27/24 502/5 |
| 2013/0303813 A1 | 11/2013 | Cabiac et al. | |
| 2015/0030968 A1 * | 1/2015 | Schwab | .............. C01B 31/0476 429/532 |
| 2015/0050583 A1 * | 2/2015 | Schuth | ................... B01J 37/084 429/524 |
| 2015/0166337 A1 | 6/2015 | Himeda et al. | |
| 2015/0380741 A1 * | 12/2015 | Serov | ..................... H01M 4/921 429/524 |
| 2016/0158730 A1 * | 6/2016 | Peng | ........................ B01J 37/16 502/185 |
| 2016/0250626 A1 | 9/2016 | Himeda et al. | |
| 2017/0232427 A1 * | 8/2017 | Shuai | ...................... B01J 27/24 210/748.09 |

FOREIGN PATENT DOCUMENTS

| | | |
|---|---|---|
| KR | 1020160010151 A | 1/2016 |
| KR | 1020160096996 A | 8/2016 |
| WO | 2013111860 A1 | 8/2013 |
| WO | 2015053317 A1 | 4/2015 |

OTHER PUBLICATIONS

Vito Di Noto et al., "Preparation, characterization and single-cell performance of a new class of Pd-carbon nitride electrocatalysts for oxygen reduction reaction in PEMFCs." Applied Catalysis B: Environmental 111-112, pp. 185-199. (Year: 2012).*
Yanxian Jin et al., "Nitrogen-doped graphene supported palladium-nickel nanoparticles with enhanced catalytic performance for formic acid oxidation." Electrochimica Acta 220, pp. 83-90. (Year: 2016).*
Zesheng Li et al., "Novel graphitic carbon nitride/graphite carbon/ palladium nanocomposite as a high-performance electrocatalyst for the ethanol oxidation reaction." Electrochimica Acta 191, pp. 606-615. (Year: 2016).*
Noramalina Mansor et al., "Graphitic Carbon Nitride as a Catalyst Support in Fuel Cells and Electrolyzers." Electrochimica Acta 222, pp. 44-57. (Year: 2016).*
Guadalupe Ramos-Sanchez et al., "Mesoporous carbon supported nanoparticulated PdNi2: A methanol tolerant oxygen reduction electrocatalyst." International Journal of Hydrogen Energy 37, pp. 31-40 (Year: 2012).*
T. A. Revathy et al., "Highly active graphene-supported palladium-nickel alloy nanoparticles for catalytic reduction of 4-nitrophenol." Applied Surface Science, pp. 1-8. (Year: 2018).*
Fang Yao et al., "Highly efficient hydrogen release from formic acid using a graphitic carbon nitride-supported AgPd nanoparticle catalyst." Applied Surface Science 426, pp. 605-611. (Year: 2017).*
Liping Shen et al., "Improvement and mechanism of electrocatalytic performance of Pd-Ni/C anodic catalyst in direct formic acid fuel cell", Electrochimica Acta, 2013, pp. 497-502, vol. 89, Elsevier Ltd.
Qiquan Luo et al., "Formic Acid Dehydrogenation on Ni(111) and Comparison with Pd(111) and Pt(11)", The Journal of Physical Chemistry, 2012, pp. 4149-4156, vol. 116, American Chemical Society.
Bjorn Loges et al., "Controlled Generation of Hydrogen from Formic Acid Amine Adducts at Room Temperature and Application in H2/O2 Fuel Cells", Angewandte Chemie, 2008, pp. 3962-3965, vol. 47, No. 21, Wiley-VCH Verlag GmbH & Co.
Elise B. Fox et al., "Aging Effects on the Properties of Imidazolium-, Quaternary Ammonium-, Pyridinium-, and Pyrrolidinium-Based Ionic Liquids Used in Fuel and Energy Production", Energy & Fuels, Aug. 21, 2013, pp. 6355-6361, vol. 27, No. 11, American Chemical Society.
Fu-Zhan Song et al., "Diamine-Alkalized Reduced Graphene Oxide: Immobilization of Sub-2 nm Palladium Nanoparticles and Optimization of Catalytic Activity for Dehydrogenation of Formic Acid" ACS Catalysis, Jul. 30, 2015, pp. 5141-5144, vol. 5, American Chemical Society.
Karaked Tedsree et al., "Hydrogen production from formic acid decomposition at room temperature using a Ag—Pd core-shell nanocatalyst", Nature Nanotechnology, Apr. 10, 2011, pp. 302-307, vol. 6.
Kun Jiang et al., "B-Doped Pd Catalyst: Boosting Room-Temperature Hydrogen Production from Formic Acid-Formate Solutions", Journal of the American Chemical Society, Mar. 17, 2014, pp. 4861-4864, vol. 136, American Chemical Society.
Martin Martis et al., "Amine-Functionalized MIL-125 with Imbedded Palladium Nanoparticles as an Efficient Catalyst for Dehydrogenation of Formic Acid at Ambient Temperature", The Journal of Physical Chemistry, 2013, pp. 22805-22810, vol. 117, American Chemical Society.
Masashi Hattori et al., "Efficient hydrogen production from formic acid using TiO2-supported AgPd@Pd nanocatalysis", Journal of Materials Chemistry A, 2015, pp. 4453-4461, vol. 3, The Royal Society of Chemistry.
Qi-Long Zhu et al., "Immobilizing Extremely Catalytically Active Palladium Nanoparticles to Carbon Nanospheres: A Weakly-Capping Growth Approach", Journal of the American Chemical Society, Aug. 31, 2015, pp. 11743-11748, vol. 137, American Chemical Society.
Steven Chu et al., "Opportunities and challenges for a sustainable energy future", Nature, Aug. 16, 2012, pp. 294-303, vol. 488, No. 7411, Macmillan Publishers Limited.
Yu-Ling Qin et al., "Efficient PdNi and PdNi@Pd-catalyzed hydrogen generation via formic acid decomposition at room temperature", Chemical Communications, 2013, pp. 10028-10030, vol. 49, The Royal Society of Chemistry.
Yu-Ling Qin et al., "Preparation of Pd—Co-Based Nanocatalysts and Their Superior Applications in Formic Acid Decomposition and Methanol Oxidation", ChemSusChem, 2015, pp. 260-263, vol. 8, Wiley-VCH Verlag GmbH & Co.
Yunjie Huang et al., "Novel PdAu@Au/C Core-Shell Catalyst: Superior Activity and Selectivity in Formic Acid Decomposition for Hydrogen Generation", Chemistry of Materials, Aug. 25, 2010, pp. 5122-5128, vol. 22, American Chemical Society.
Zhi-Li Wang et al., "Facile synthesis of nitrogen-doped graphene supported AuPd—CeO2 nanocomposites with high-performance for hydrogen generation from formic acid at room temperature", Nanoscale, 2014, pp. 3073-3077, vol. 6, The Royal Society of Chemistry.

* cited by examiner

CATALYST FOR DEHYDROGENATION REACTION OF FORMIC ACID AND METHOD FOR PREPARING THE SAME

CROSS-REFERENCE TO RELATED APPLICATION

This application claims the priority of Korean Patent Application No. 10-2016-0119407, filed on Sep. 19, 2016 and all the benefits accruing therefrom under 35 U.S.C. § 119, the contents of which in its entirety are herein incorporated by reference.

BACKGROUND

1. Field

The present disclosure relates to a catalyst for a dehydrogenation reaction of formic acid and a method for preparing the same, and more specifically, to a catalyst for a dehydrogenation reaction of formic acid, which has excellent efficiency, and a method for preparing the same.

[Description of the National Support Research and Development]

This study is made by the support of the National Research Foundation of Korea (NRF) funded by the Ministry of Science, ICT and Future Planning, Republic of Korea under the supervision of Korea Institute of Science and Technology, the project title is 'Development of Technologies for Climate Change Mitigation', and the project name is 'Development of Stationary Hydrogen Storage Original Technology' (Project identification No.: 1711033098).

2. Description of the Related Art

Efficient and sustainable technologies are being extensively studied to address concerns about energy and environmental issues for future energy production and storage. Utilization of hydrogen via fuel cells is emerging as one of the promising alternatives to carbon-based fuels for power generation. In order to achieve a hydrogen economy, hydrogen storage systems that store large amounts of hydrogen in a safe manner need to be developed For this purpose, metal hydrides, metal-organic frameworks, chemical hydrides, and the like have been studied as a potential hydrogen storage material over the past several decades. Among them, in particular, sodium borohydride and ammonia borane, which are a chemical hydrogen storage material, have attracted considerable attention as a hydrogen storage material capable of being applied to fuel cell systems because sodium borohydride and ammonia borane can release hydrogen while having a high volumetric hydrogen storage density. Since these chemical hydrogen storage materials store produced hydrogen as a molecule in a liquid or solid state, it is possible to store hydrogen and transport hydrogen to a desired place in an economically efficient manner.

Formic acid is a nontoxic liquid, which is readily available via biomass processing, and is known to be a potential reversible hydrogen storage material, which is relatively safe. Hydrogen chemically stored in formic acid can be released even at room temperature by using various transition metal-based catalysts ($HCOOH \rightarrow CO_2 + H_2$), and the thus released hydrogen can be supplied to a polymer electrolyte membrane fuel cell (PEMFC), thereby producing electricity.

For the formic acid dehydrogenation reaction as described above, numerous heterogeneous catalysts have recently been developed, and among them, Pd-based nanomaterials including Pd nanoparticles (NPs), PdM (M=Ag, Au, Ni, or Co, and the like) core-shells, and Pd-based alloys were reported to be excellent. Besides, in order to develop low cost catalysts for practical fuel cell applications, Pd-based catalysts including non-noble metals have also been continuously reported. However, development of cheap catalysts with a minimum amount of noble metals, which enable a formic acid dehydrogenation reaction with fast rates, still remains one of the main challenges.

REFERENCES OF THE RELATED ART

Non-Patent Documents (Non-Patent Document 1) Chu, S.; Majumdar, A., Opportunities and challenges for a sustainable energy future. Nature 2012, 488 (7411), 294-303

(Non-Patent Document 2) Fox, E. B.; Liu, Z.-W.; Liu, Z.-T., Ultraclean Fuels Production and Utilization for the Twenty First Century: Advances toward Sustainable Transportation Fuels. Energy & Fuels 2013, 27 (11), 6335-6338

SUMMARY

In an aspect, the present disclosure is directed to providing a catalyst for a dehydrogenation reaction of formic acid, which has excellent catalytic activity, the catalyst including a non-metal as an active site constituent element.

In another aspect, the present disclosure is directed to providing a method for preparing the catalyst for a dehydrogenation reaction of formic acid.

In an aspect, the present disclosure provides a method for preparing a catalyst for a dehydrogenation reaction of formic acid, the method including: preparing a nitrogen-doped carbon support; forming a mixed solution including a first aqueous metal precursor solution which includes palladium (Pd) and a second aqueous metal precursor solution which includes nickel (Ni); and forming a catalyst for a dehydrogenation reaction of formic acid by stirring the nitrogen-doped carbon support with the mixed solution, and then immobilizing alloy particles of Pd and Ni on the nitrogen-doped carbon support.

In an exemplary embodiment, the preparing of the nitrogen-doped carbon support may include: dissolving and stirring dicyandiamide and carbon black in a solvent; obtaining carbon black onto which a nitrogen precursor is adsorbed by evaporating the solvent at 50° C. to 150° C.; and preparing a nitrogen-doped carbon support by subjecting the obtained carbon black onto which the nitrogen precursor is adsorbed to heat treatment in an inert atmosphere at 400° C. to 700° C.

In another exemplary embodiment, the carbon black may comprise at least one selected from the group comprising ketjen-black, vulcan, activated carbon, carbon nanotubes, carbon fibers, fullerene and graphene.

In another exemplary embodiment, a molar ratio of Pd ions to Ni ions in the mixed solution may be 1:0.33 to 1:3.

In another exemplary embodiment, the first aqueous metal precursor solution may be a Pd complex compound coordinated with an organic ligand, and the second aqueous metal precursor solution may be a Ni complex compound coordinated with an organic ligand.

In another exemplary embodiment, the immobilizing of the alloy particles of Pd and Ni on the nitrogen-doped carbon support may be performed at 400° C. to 500° C. for 3 to 5 hours.

In another exemplary embodiment, the alloy particles of Pd and Ni may have an average particle diameter of 1.0 nm to 3.7 nm.

In another aspect of the present disclosure, provided is a catalyst for a dehydrogenation reaction of formic acid, including alloy particles of Pd and Ni supported on a graphitic carbon nitride support.

In an exemplary embodiment, a molar ratio of Pd to Ni may be 1:0.37 to 1:3.6.

In another exemplary embodiment, the alloy particles of Pd and Ni may have an average particle diameter of 1.0 nm to 3.7 nm.

A catalyst for a dehydrogenation reaction of formic acid according to an aspect of the present disclosure may exhibit excellent catalytic activity. Accordingly, the catalyst for a dehydrogenation reaction of formic acid may be widely used in the fuel cell field.

BRIEF DESCRIPTION OF THE DRAWINGS

FIG. 2A is an HADDF-STEM image of $Pd_1Ni_{1.3}$/N—C, FIG. 2B is an HADDF-STEM image of $Pd_1Ni_{1.3}$/C, FIG. 2C illustrates a line profile of $Pd_1Ni_{1.3}$/N—C, and FIG. 2D illustrates a line profile of $Pd_1Ni_{1.3}$/C.

FIG. 3A is an HADDF-STEM image of Pd/N—C, FIG. 3B is an HADDF-STEM image of $Pd_1Ni_{0.37}$/N—C, and FIG. 3C is an HADDF-STEM image of $Pd_1Ni_{3.6}$/N—C.

FIG. 4A is an XRD graph of Pd/N—C, $Pd_1Ni_{0.37}$/N—C, $Pd_1Ni_{1.3}$/N—C, $Pd_1Ni_{3.6}$/N—C, and Ni/N—C catalysts, and FIG. 4B is XPS Pd 3d spectra of Pd/N—C, $Pd_1Ni_{0.37}$/N—C, $Pd_1Ni_{1.3}$/N—C, and $Pd_1Ni_{3.6}$/N—C catalysts.

DETAILED DESCRIPTION

Figure 1:
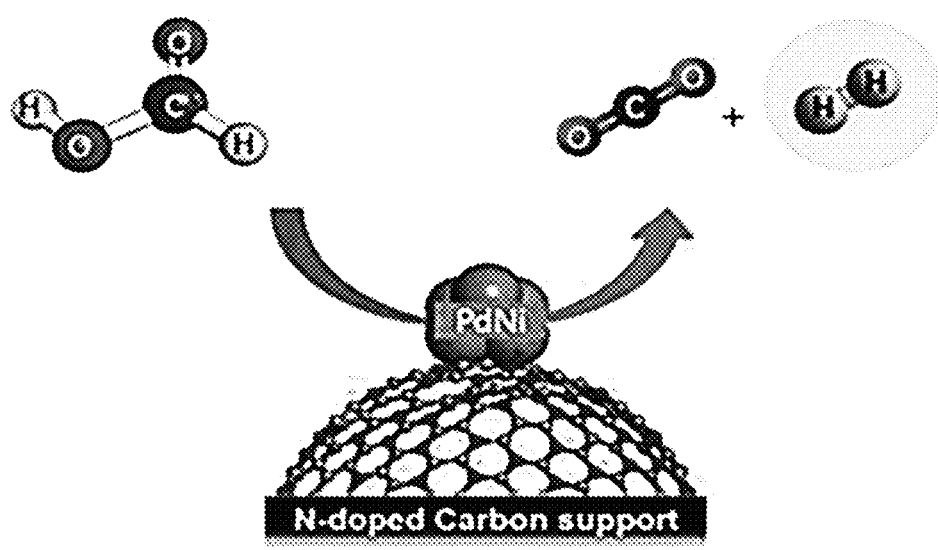
FIG. 1 is a schematic view illustrating a reaction of a catalyst for a dehydrogenation of formic acid according to an aspect of the present disclosure.

Hereinafter, embodiments of the present disclosure will be described in detail. Embodiments of the present disclosure have been described with reference to accompanying drawings, but have been described for illustration, and the technical spirit of the present disclosure and the configuration and application thereof are not limited thereby.

In an aspect, the present disclosure provides a method for preparing a catalyst for a dehydrogenation reaction of formic acid, the method including: preparing a nitrogen-doped carbon support; forming a mixed solution including a first aqueous metal precursor solution which includes palladium (Pd) and a second aqueous metal precursor solution which includes nickel (Ni); and forming a catalyst for a dehydrogenation reaction of formic acid by stirring the nitrogen-doped carbon support with the mixed solution, and then immobilizing alloy particles of Pd and Ni on the nitrogen-doped carbon support.

Hereinafter, the present disclosure will be described in detail.

First, a nitrogen-doped carbon support is prepared.

Specifically, a carbon precursor onto which a nitrogen precursor is adsorbed may be obtained by dissolving or dispersing a nitrogen precursor and a carbon precursor in a solvent, stirring the resulting solution or dispersion, and then evaporating the solvent at 50° C. to 150° C.

In an exemplary embodiment, the nitrogen precursor may be amino acid including a nitrogen atom, nitrogen, or an organic or inorganic compound composed of nitrogen and carbon, and for example, the nitrogen precursor may be dicyandiamide, histidine, cysteine, aspartic acid, ammonia, and the like.

Further, the carbon precursor may include one or more selected from the group consisting of, for example, carbon black, carbon nanotubes, graphene, and the like.

Thereafter, a nitrogen-doped carbon support is prepared by subjecting the obtained carbon precursor onto which the nitrogen precursor is adsorbed to heat treatment in an inert atmosphere at 400° C. to 700° C.

In an aspect, the carbon black may comprise at least one selected from the group comprising ketjen-black, vulcan, activated carbon, carbon nanotubes, carbon fibers, fullerene and graphene.

In an exemplary embodiment, when the nitrogen precursor is dicyandiamide and the carbon black is Ketjen-Black, the process of subjecting the carbon black onto which the nitrogen precursor is adsorbed to heat treatment may be performed at a temperature of about 550° C.

Thereafter, a mixed solution including a first aqueous metal precursor solution and a second aqueous metal precursor solution is formed.

In an exemplary embodiment, the first aqueous metal precursor solution may be an aqueous solution including Pd ions, and specifically, may include one or more selected from the group consisting of $Pd(NO_3)_2 \cdot 2H_2O$, $PdCl_2$, a Pd complex compound coordinated with an organic ligand, and the like.

For example, the first aqueous metal precursor solution may include one or more selected from the group consisting of $Pd(NO_3)_2 \cdot 2H_2O$ and $PdCl_2$.

In an aspect, the organic ligand is not limited as long as the organic ligand is a material which may be coordinated with Pd to form a Pd complex compound, such as acetylacetonate, trifluoroacetate, triphenylphosphane, imidazolium and hydrocarbon comprising phenyl, benzyl, and alkyl.

Further, the second aqueous metal precursor solution may be an aqueous solution including Ni ions, and specifically, may include one or more selected from the group consisting of $Ni(NO_3)_2 \cdot 6H_2O$, $NiCl_2$, a Ni complex compound coordinated with an organic ligand, and the like. In this case, the organic ligand is not limited as long as the organic ligand is a material which may be coordinated with Ni to form a Ni complex compound, such as acetylacetonate, trifluoroacetate, triphenylphosphane, imidazolium, phenyl, benzyl, and alkyl.

For example, the second aqueous metal precursor solution may include one or more selected from the group consisting of $Ni(NO_3)_2 \cdot 6H_2O$ and $NiCl_2$.

In an exemplary embodiment, in the mixed solution, the molar ratio of Pd ions to Ni ions in the mixed solution may be 1:0.33 to 1:3, preferably 1:0.9 to 1:1.1. More preferably, the molar ratio may be 1:1. When the molar ratio of Pd ions to Ni ions is less than 1:0.33, it may be difficult to secure the economic efficiency of the catalyst, and when the more ratio is more than 1:3, the rate of the formic acid dehydrogenation reaction may be reduced.

Thereafter, a carbon support doped with nitrogen previously formed is stirred with the mixed solution, and then Pd and Ni ions are immobilized onto the support, and an alloy catalyst for a dehydrogenation reaction of formic acid is formed through a heat treatment.

Specifically, the nitrogen-doped carbon support is dispersed in the mixed solution by stirring the nitrogen-doped carbon support with the mixed solution at room temperature. Accordingly, a pre-catalyst may be prepared by supporting palladium ions and nickel ions in the mixed solution on the nitrogen-doped carbon support. Thereafter, the palladium ions and nickel ions of the pre-catalyst are reduced by using a mixed gas including hydrogen, and a heat treatment is performed. During the process, Pd and Ni metals may be alloyed, and simultaneously, the corresponding alloy particles may be immobilized onto the nitrogen-doped carbon support to ultimately prepare a catalyst for a dehydrogenation reaction of formic acid, in which Pd-Ni alloy particles are immobilized onto the nitrogen-doped carbon support.

In an aspect, the mixed gas may include hydrogen ($H_2$) and nitrogen ($N_2$) gases at a volume ratio of about 20:80.

In an aspect, the process of reducing the pre-catalyst by using a mixed gas may proceed through a heat treatment process performed in a temperature range of 400° C. to 500° C. When the heat treatment is performed at a temperature of less than 400° C., the metal may be insufficiently reduced, and when the heat treatment is performed at a temperature of more than 500° C., the performance of active sites may deteriorate due to the sintering process.

Meanwhile, the heat treatment process may be performed for 3 to 5 hours. When the heat treatment process is performed for less than 3 hours, the metal may be insufficiently reduced, and when the heat treatment process is performed for more than 5 hours, the performance of active sites may deteriorate due to the sintering process.

Accordingly, there is prepared a catalyst for a dehydrogenation reaction of formic acid, including alloy particles of Pd and Ni supported on a nitrogen-doped carbon support including graphitic carbon nitride through the above-described process.

In an exemplary embodiment, the molar ratio of Pd to Ni may be 1:0.37 to 3.6, preferably 1:1.1 to 1.4. More preferably, the molar ratio of Pd to Ni may be 1:1.3. When the molar ratio of Pd to Ni is less than 1:0.37 or more than 1:3.6, the activity of the catalyst may not be excellent.

In an exemplary embodiment, the alloy particles of Pd and Ni may have an average particle diameter of 3.7 nm or less, for example, an average particle diameter of 1.0 nm to 3.7 nm. When the alloy particles of Pd and Ni have an average particle diameter of less than 1.0 or an average particle diameter of more than 3.7 nm, the performance of the catalyst may deteriorate.

As described above, in the present disclosure, alloy particles of Pd and Ni are supported on a nitrogen-doped carbon support. Through a change in electronic characteristics of active sites caused by interaction between metal and support and a change in energy of active sites caused by alloy particles of Pd and Ni, an alloy catalyst of Pd and Ni, which is supported on a nitrogen-doped carbon support, may exhibit excellent catalytic activity towards formic acid dehydrogenation reaction.

Specifically, when the catalyst is used, the formic acid deprotonation and the production rate of formate which is a main intermediate may be enhanced by nitrogen doped onto a carbon-based support. Further, the production rate of hydride ions may be enhanced through activation of C—H bonds of formic acid caused by interaction between nitrogen and Pd nanoparticles. That is, nitrogen of the N—C support may serve as a Bronsted base and a Lewis base, thereby enhancing the reaction rate of formic acid decomposition. Further, in the catalyst, the surface of the alloy particle of Pd and Ni may increase the catalytic activity by lowering the activation energy along the reaction mechanism of formic acid decomposition reaction (FIG. 1).

Accordingly, since the alloy particles of Pd and Ni and the nitrogen-doped carbon support have the synergetic effects, the catalyst including the same according to the present disclosure may exhibit excellent activity and selectivity towards formic acid dehydrogenation reaction.

Hereinafter, the present disclosure will be described in more detail through Examples. These Examples are only for exemplifying the present disclosure, and it will be obvious to those skilled in the art that the scope of the present disclosure is not interpreted to be limited by these Examples.

EXAMPLES

Example 1

First, a nitrogen precursor (dicyandiamide, 1.0 g) and ketjen carbon black (1.0 g) were dissolved in distilled water (50 mL), and then the distilled water was completely evaporated with stirring at a temperature of about 100° C. for 4 hours, thereby obtaining a ketjen black carbon onto which a nitrogen precursor was adsorbed. The resulting ketjen black carbon was pyrolyzed at 550° C. for 4 hours under a nitrogen atmosphere, thereby obtaining a nitrogen-doped carbon support (N—C).

Thereafter, $Pd(NO_3)_2 \cdot 2H_2O$ being a palladium precursor and $Ni(NO_3)_2 \cdot 6H_2O$ being a nickel precursor were dissolved at a Pd/Ni molar ratio (1/0.33) in distilled water, and then the N—C support was added thereto, the resulting mixture was stirred and dispersed at room temperature, thereby obtaining a pre-catalyst. Subsequently, the pre-catalyst was reduced at 450° C. for 4 hours by using a 20% $H_2$/80% $N_2$ mixed gas, thereby obtaining a catalyst having a Pd/Ni molar ratio of $Pd_1Ni_{0.37}$ ($Pd_1Ni_{0.37}$/N—C).

Example 2

In Example 1, $Pd(NO_3)_2 \cdot 2H_2$) and $Ni(NO_3)_2 \cdot 6H_2O$ being a nickel precursor were dissolved at a Pd/Ni molar ratio of 1/1 in distilled water, thereby obtaining a catalyst having a Pd/Ni molar ratio of $Pd_1Ni_{1.3}$ ($Pd_1Ni_{1.3}$/N—C).

Example 3

In Example 1, $Pd(NO_3)_2 \cdot 2H_2O$ and $Ni(NO_3)_2 \cdot 6H_2O$ being a nickel precursor were dissolved at a Pd/Ni molar ratio of 1/3 in distilled water, thereby obtaining a catalyst having a Pd/Ni molar ratio of $Pd_1Ni_{3.6}$ ($Pd_1Ni_{3.6}$/N—C).

Comparative Example 1

In Example 1, only $Pd(NO_3)_2 \cdot 2H_2O$ being a palladium precursor was dissolved in distilled water, the N—C support was added thereto, and the resulting mixture was stirred, thereby preparing a Pd/N—C catalyst.

Comparative Example 2

In Example 1, only $Ni(NO_3)_2 \cdot 6H_2O$ being a nickel precursor was dissolved in distilled water, the N—C support was added thereto, and the resulting mixture was stirred, thereby preparing a Ni/N—C catalyst.

Comparative Example 3

After a carbon support was prepared by using ketjen carbon black, $Pd(NO_3)_2 \cdot 2H_2O$ being a palladium precursor and $Ni(NO_3)_2 \cdot 6H_2O$ being a nickel precursor were dissolved at a Pd/Ni molar ratio (1/0.33) in distilled water, and then the carbon support was added thereto, the resulting mixture was stirred and dispersed at room temperature, thereby obtaining a pre-catalyst. Subsequently, the pre-catalyst was reduced at 450° C. for 4 hours by using a 20% $H_2$/80% $N_2$ mixed gas, thereby obtaining a catalyst having a Pd/Ni molar ratio of $Pd_1Ni_{1.3}$ ($Pd_1Ni_{1.3}$/C).

Experimental Example 1

Confirmation of Characteristics of Prepared Catalysts

Characteristics of the catalysts prepared according to Examples 1 to 3 and Comparative Examples 1 and 2 were compared by using Inductively Coupled Plasma Optical Emission Spectroscopy (ICP-OES), and are shown in the following Table 1.

TABLE 1

| Samples | ICP-OES/AAS | | | Nominal feeding |
|---|---|---|---|---|
| | Pd wt % | Ni wt % | Pd/Ni atomic ratio | Pd/Ni atomic ratio |
| Pd | 3.81 | — | — | — |
| $Pd_1Ni_{0.37}$ | 4.08 | 0.84 | 2.68 | 3 |
| $Pd_1Ni_{1.3}$ | 3.78 | 2.72 | 0.77 | 1 |
| $Pd_1Ni_{3.6}$ | 3.3 | 6.53 | 0.28 | 0.33 |
| Ni | — | 3.79 | — | — |

Figure 2A:
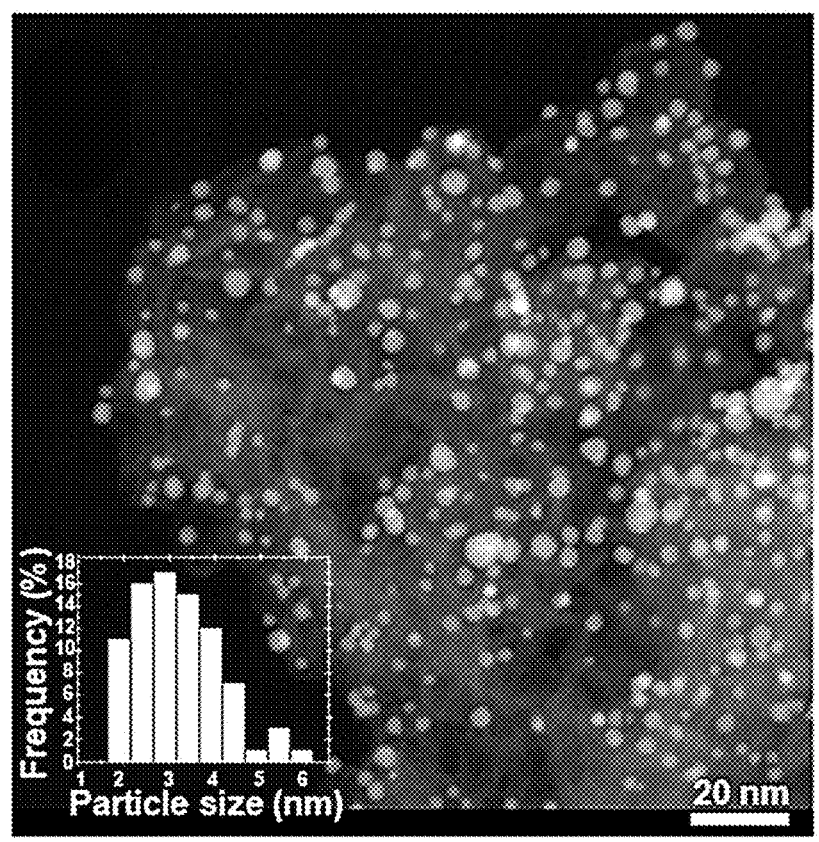
FIGS. 2A to 2D illustrate HADDF-STEM images and line profiles of the catalyst for a dehydrogenation reaction of formic acid according to an aspect of the present disclosure.
Figure 2B:
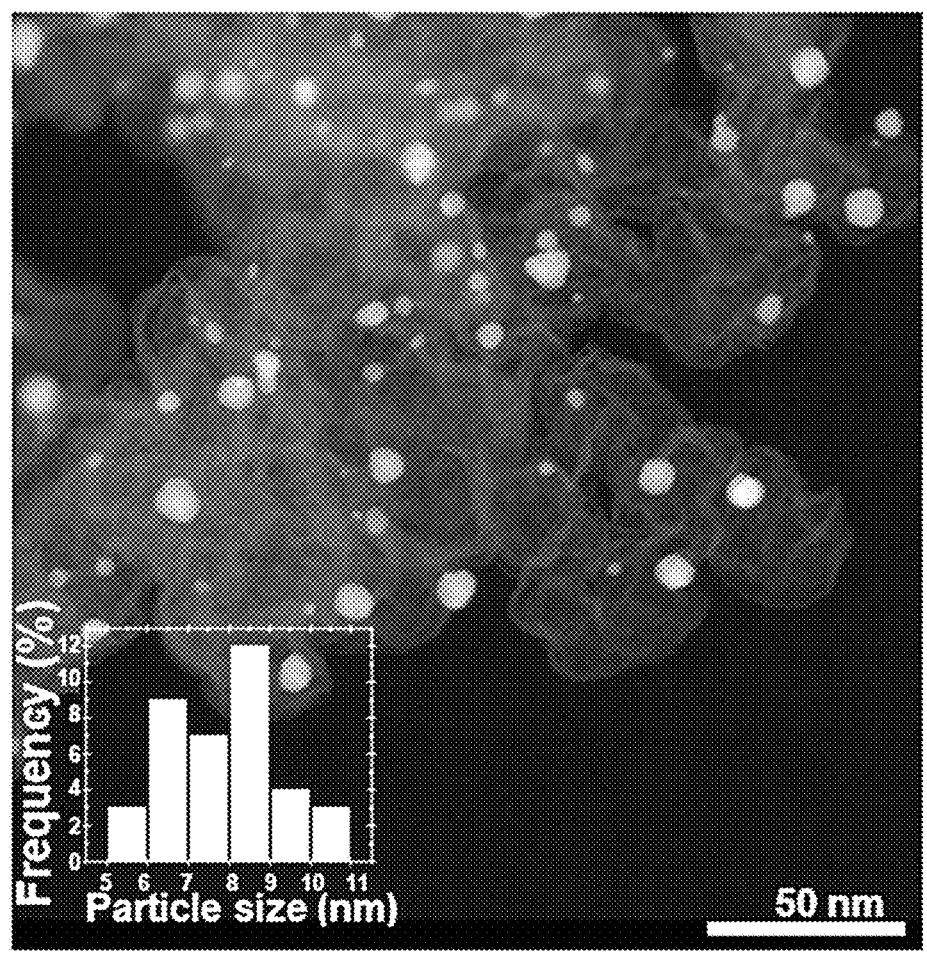
Figure 2C:
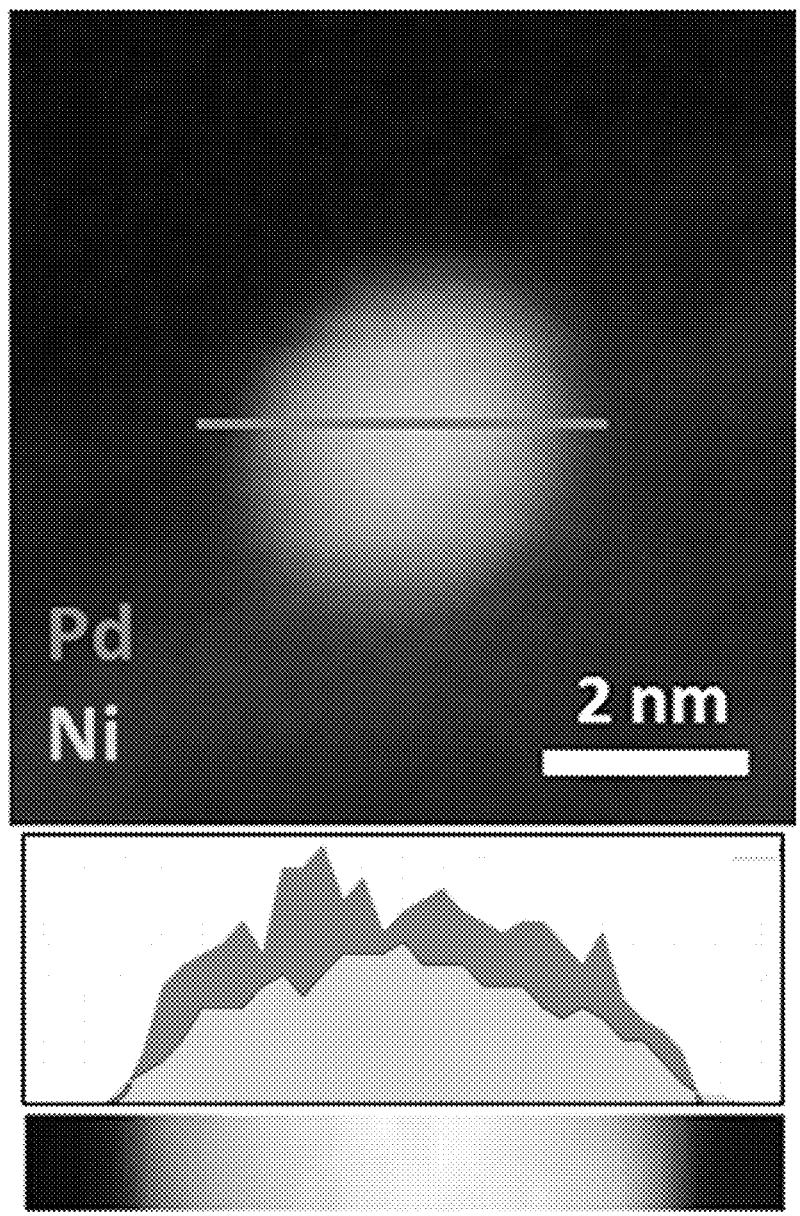
Figure 2D:
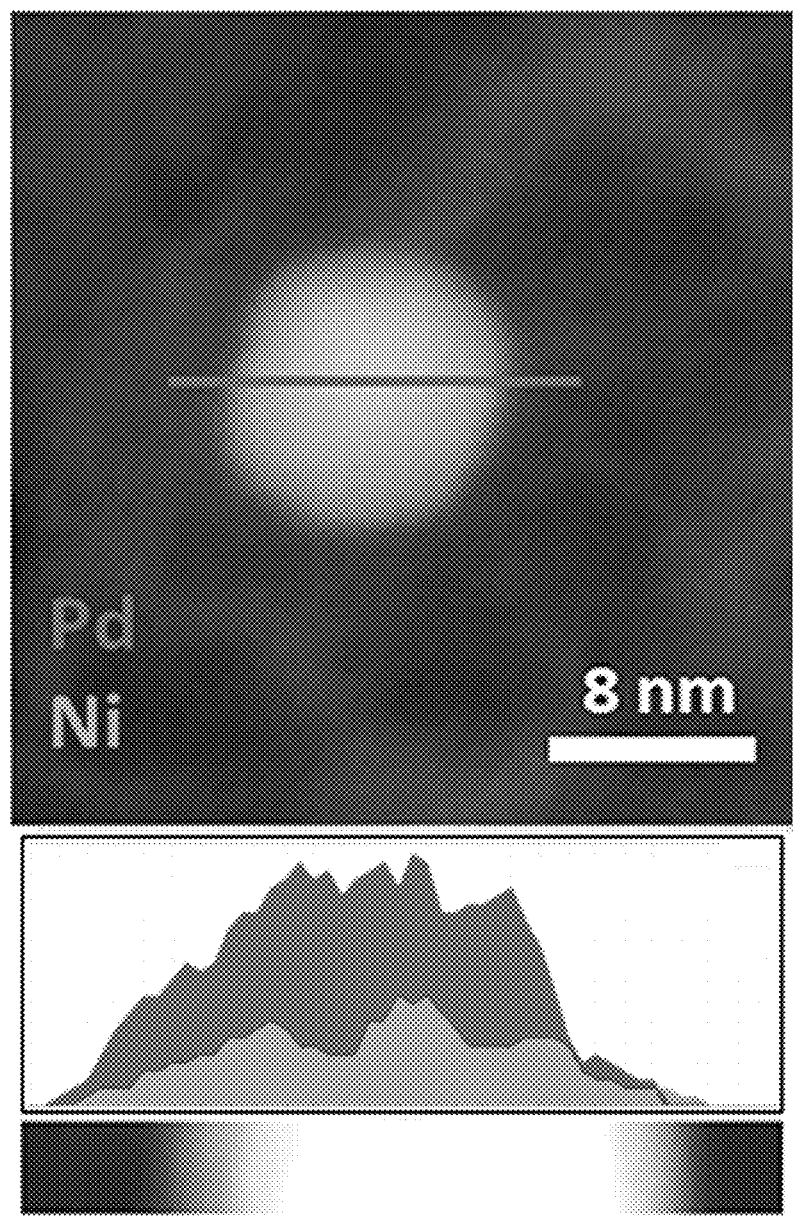

Further, characteristics of the catalysts prepared according to Example 2 and Comparative Example 3 are shown in FIGS. 2A to 2D by using HADDF-STEM. FIG. 2A is an HADDF-STEM image of $Pd_1Ni_{1.3}$/N—C, FIG. 2B is an HADDF-STEM image of $Pd_1Ni_{1.3}$/C, FIG. 2C illustrates a line profile of $Pd_1Ni_{1.3}$/N—C, and FIG. 2D illustrates a line profile of $Pd_1Ni_{1.3}$/C.

Referring to FIGS. 2A and 2C, through comparison with $Pd_1Ni_{1.3}$/C (Comparative Example 3) described in FIGS. 2B and 2D, it was observed that smaller Pd—Ni alloy particles having an average size of 3.2 nm were uniformly dispersed in $Pd_1Ni_{1.3}$/N—C (Example 2).

Figure 3A:
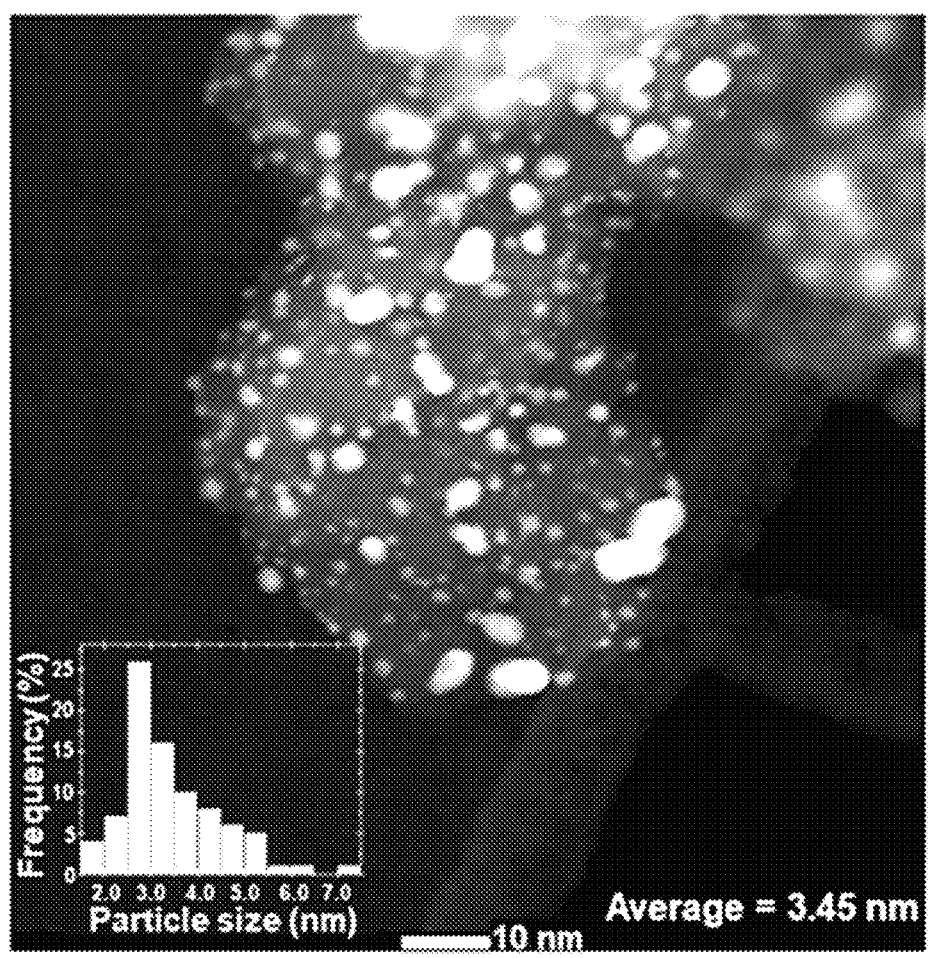
FIGS. 3A to 3C are HADDF-STEM images of catalysts for a dehydrogenation reaction of formic acid according to Comparative Examples and Examples. Specifically.
Figure 3B:
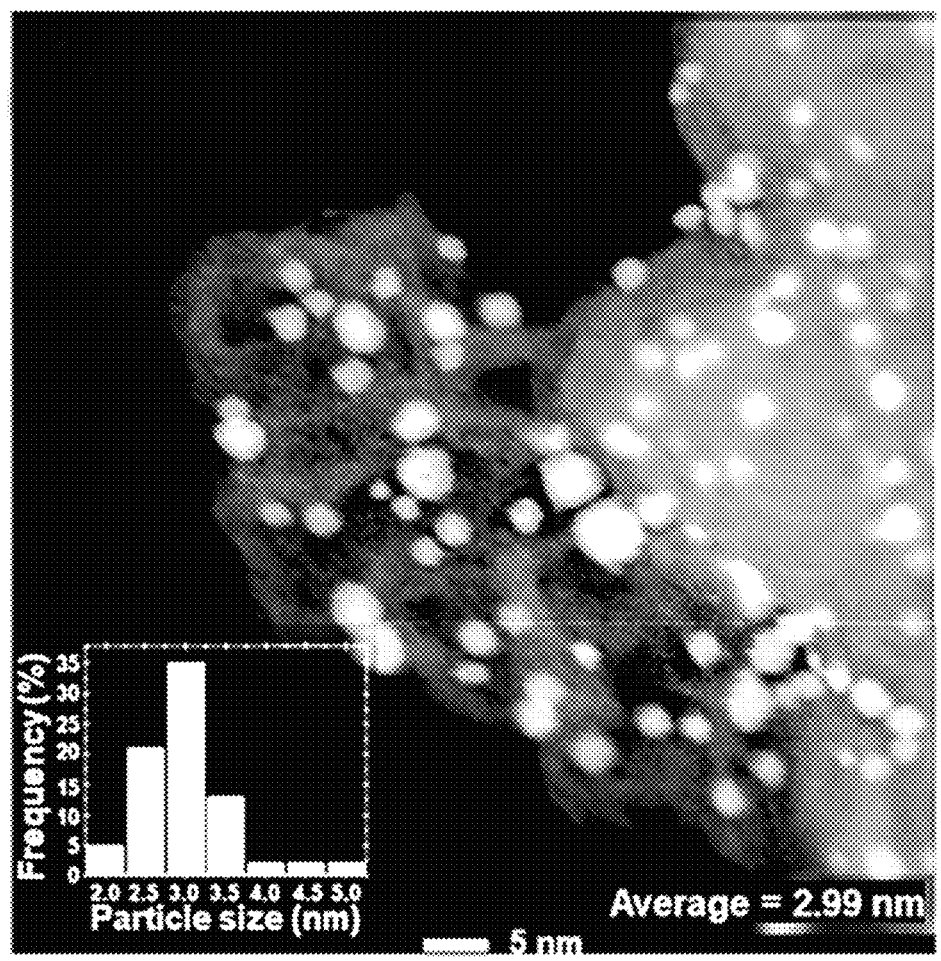
Figure 3C:
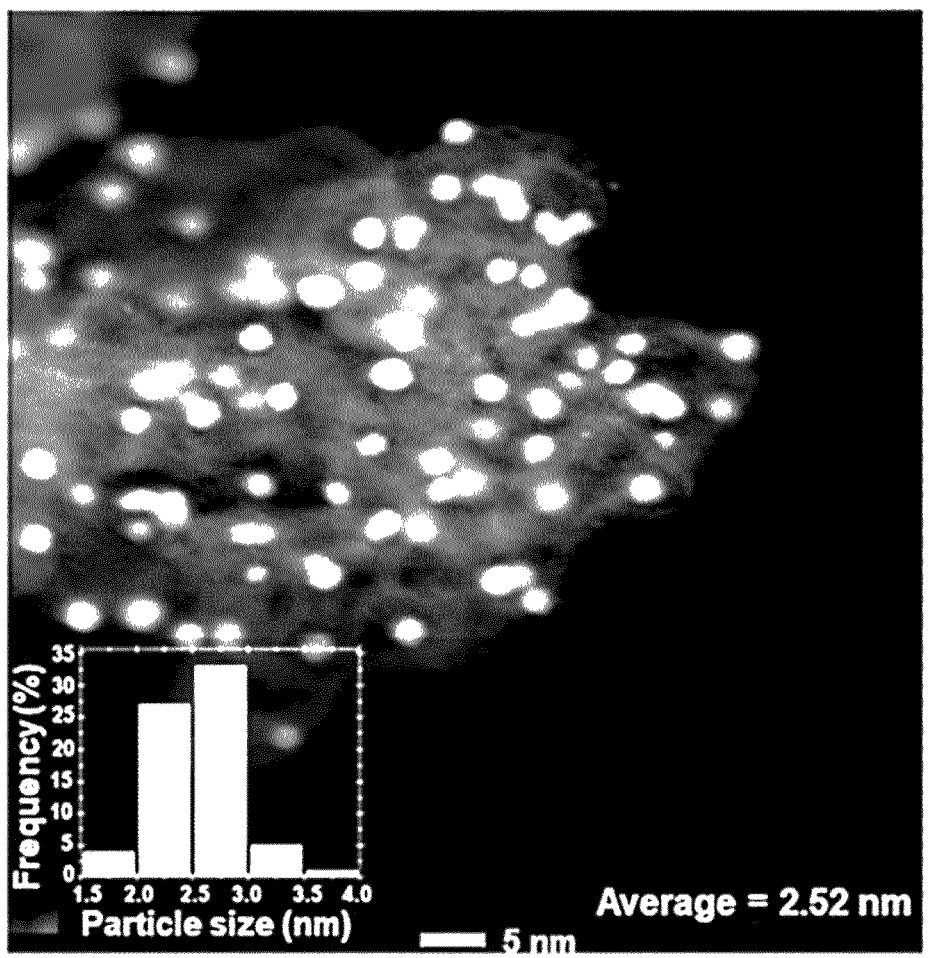

In addition, characteristics of the catalysts prepared according to Comparative Example 1 and Examples 1 and 3 are illustrated in FIGS. 3A to 3C by using HADDF-STEM. FIG. 3A is an HADDF-STEM image of Pd/N—C, FIG. 3B is an HADDF-STEM image of $Pd_1Ni_{0.37}$/N—C, and FIG. 3C is an HADDF-STEM image of $Pd_1Ni_{3.6}$/N—C.

Referring to FIG. 3A to FIG. 3C, it could be once again confirmed that the nitrogen-doped carbon support helped to more easily disperse metal Pd and alloy particles of Pd and Ni.

Figure 4A:
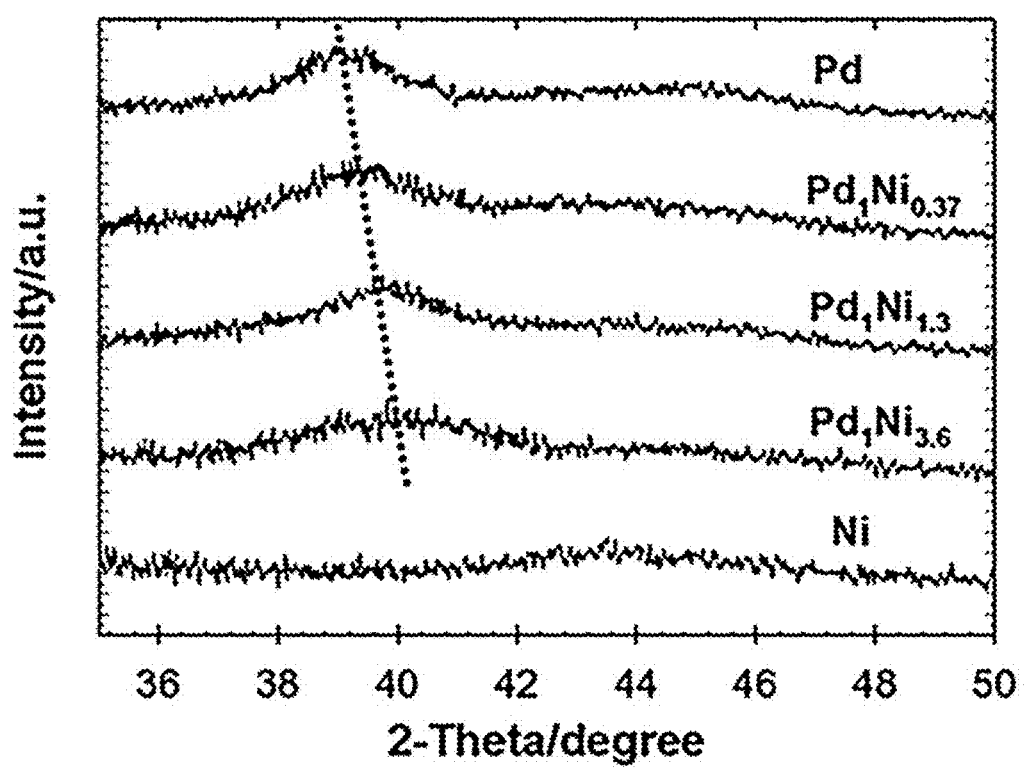
FIGS. 4A and 4B are graphs illustrating X-ray irradiation experimental results of the catalyst according to an aspect of the present disclosure. Specifically.
Figure 4B:
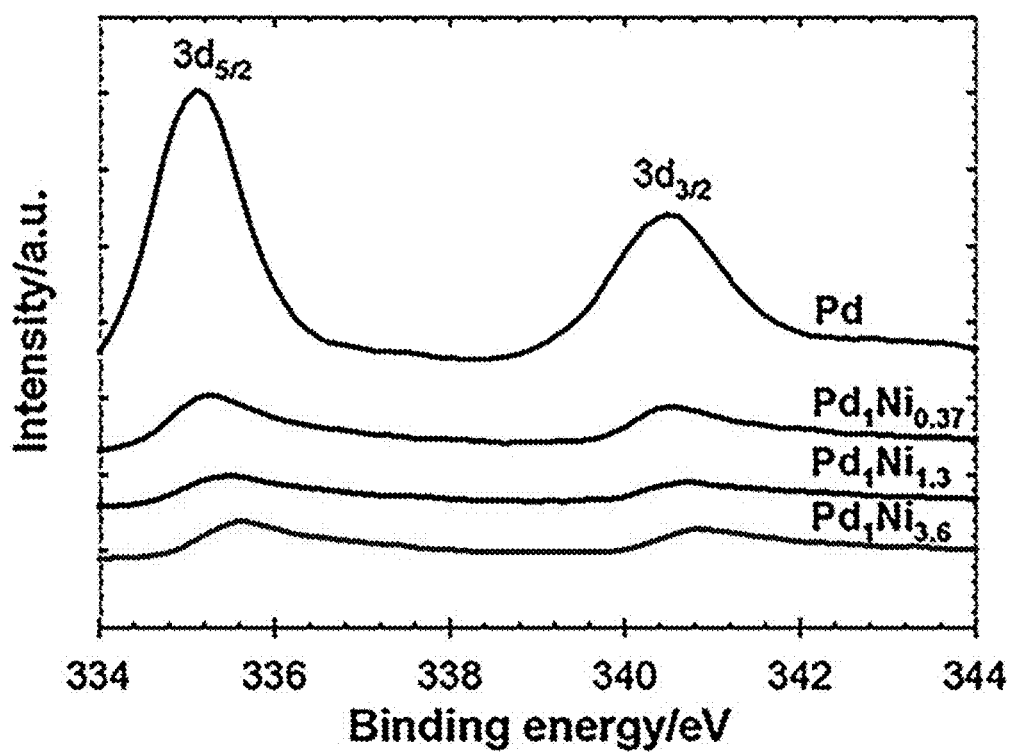

Finally, the XRD spectra of PdNi/N—C according to the Pd/Ni content are illustrated in FIGS. 4A and 4B. FIG. 4A is an XRD graph of Pd/N—C (Comparative Example 1), $Pd_1Ni_{0.37}$/N—C (Example 1), $Pd_1Ni_{1.3}$/N—C (Example 2), $Pd_1Ni_{3.6}$/N—C (Example 3), and Ni/N—C (Comparative Example 2), and FIG. 4B is XPS Pd 3d spectra of Pd/N—C (Comparative Example 1), $Pd_1Ni_{0.37}$/N—C (Example 1), $Pd_1Ni_{1.3}$/N—C (Example 2), and $Pd_1Ni_{3.6}$/N—C (Example 3).

Referring to FIG. 4A, it could be confirmed that as the Ni content increased, the diffraction peak of each catalyst was shifted into higher diffraction angles than 39.06° being a diffraction peak corresponding to Pd of Pd/N—C (Pd, 39.06°; $Pd_1Ni_{0.37}$, 39.32°; $Pd_1Ni_{1.3}$, 39.85°; $Pd_1Ni_{3.6}$, 40.11°; and Ni, 43.46°). Further, referring to FIG. 4B, it could be confirmed that the binding energies corresponding to $Pd(3d_{5/2})$ and $Pd(3d_{3/2})$ of the catalyst increased as the ratio of Ni metal increased ($Pd_1$—$Ni_{0.33}$, 335.3, 340.5; $Pd_1$—$Ni_1$, 335.6, 340.8; and $Pd_1$—$Ni_3$, 335.6, 340.9).

Experimental Example 2

Evaluation of Activity of Catalyst for Formic Acid Dehydrogenation

In order to evaluate the catalytic activities of the catalysts for a dehydrogenation reaction of formic acid prepared according to Examples 1 to 3 and Comparative Examples 1 and 2, each of the catalysts was added to a 1 M aqueous formic acid solution and a 1 M sodium formate solution, and then the quantity of generated gases over time was measured with stirring at room temperature. Thereafter, the results are illustrated in FIGS. 5A and 5B.

Figure 5A:
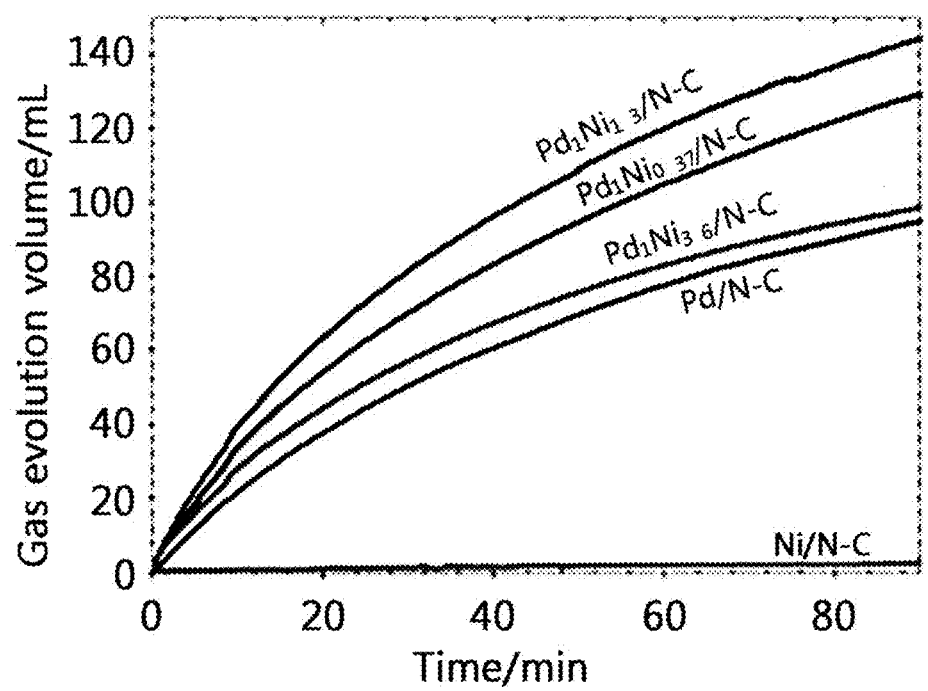
FIGS. 5A and 5B are each a graph illustrating the activity evaluation of the catalyst towards formic acid dehydrogenation reaction of the catalyst for a dehydrogenation reaction of formic acid according to an aspect of the present disclosure.
Figure 5B:
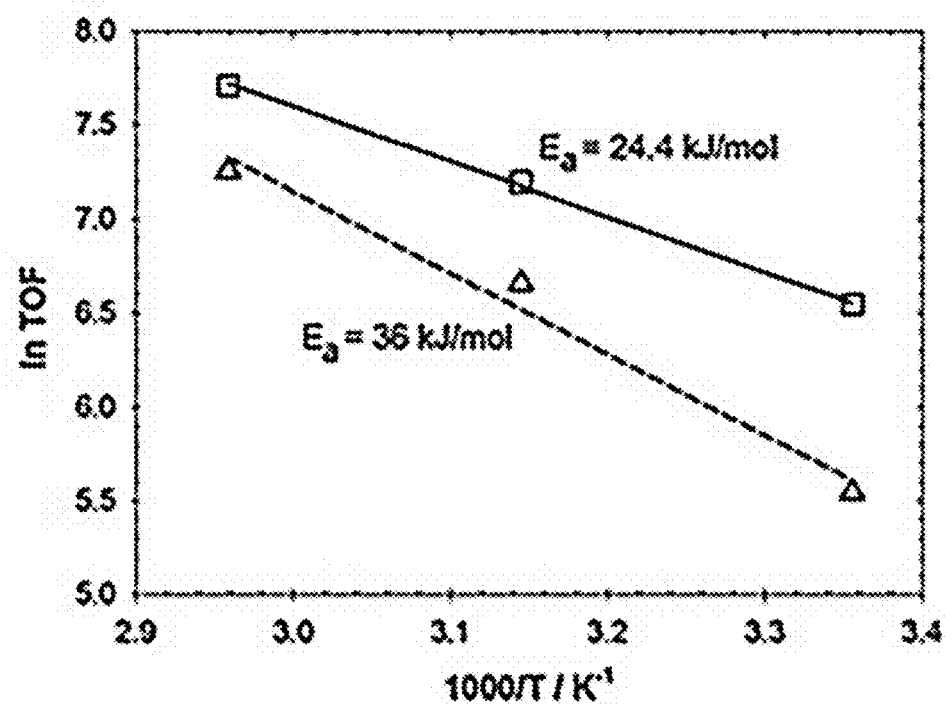

Referring to FIGS. 5A and 5B, it could be confirmed that when a Ni/N—C catalyst having no Pd active sites was utilized, the activity towards formic acid decomposition reaction was not exhibited. Meanwhile, when Pd/N—C was compared with Ni/N—C, it could be seen that the catalyst using Pd exhibited higher catalytic activity than the catalyst using Ni, and accordingly, it could be confirmed that a catalyst suitable for formic acid dehydrogenation reaction is the Pd metal. Further, when a PdNi/N—C alloy catalyst was compared with Pd/N—C, it could be confirmed that Ni played an important role in manipulating the Pd electronic structure thus increasing the $H_2$-release activity from formic acid.

In this case, in the case of TOF meaning the reaction rate, it could be confirmed that the TOF of each catalyst was much higher than that of Pd/N—C (TOF=459 $h^{-1}$) at 30° C., and the TOFs of $Pd1Ni_{0.37}$/N—C, $Pd_1Ni_{1.3}$/N—C, and $Pd_1Ni_{3.6}$/N—C were calculated as 721 $h^{-1}$, 861 $h^{-1}$, and 648 $h^{-1}$, respectively.

Experimental Example 3

Figure 6A:
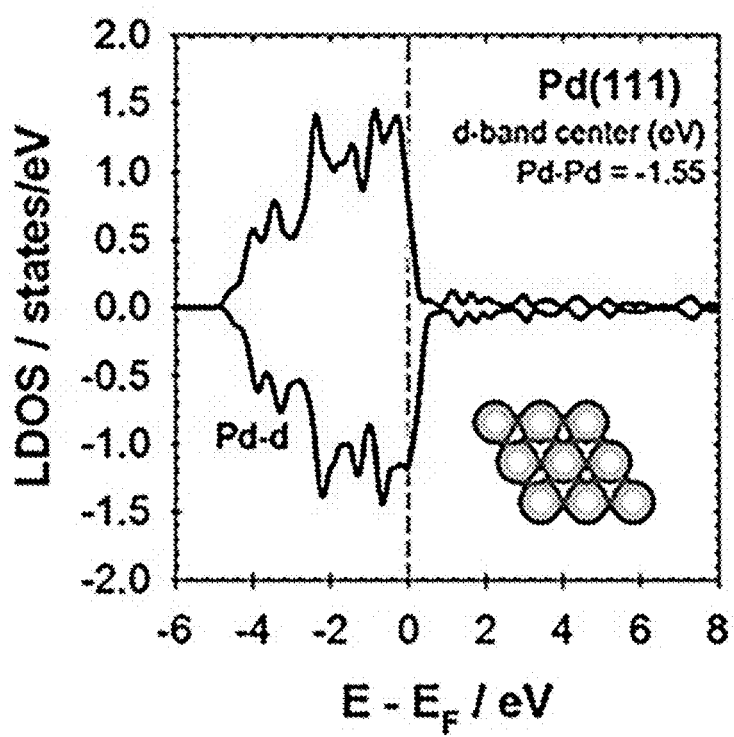
FIGS. 6A to 6D are graphs illustrating the d-band structure of the active sites of the catalyst prepared according to an aspect of the present disclosure.
Figure 6B:
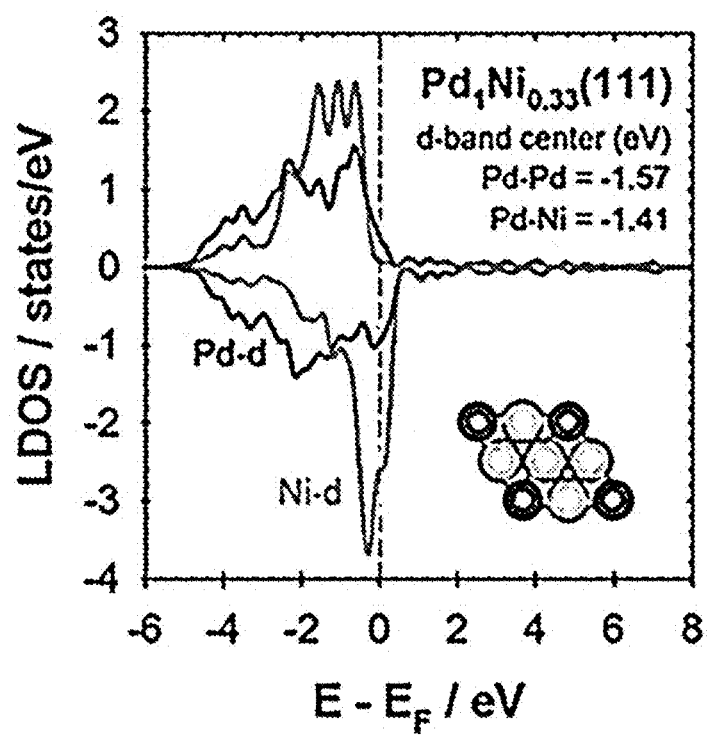
Figure 6C:
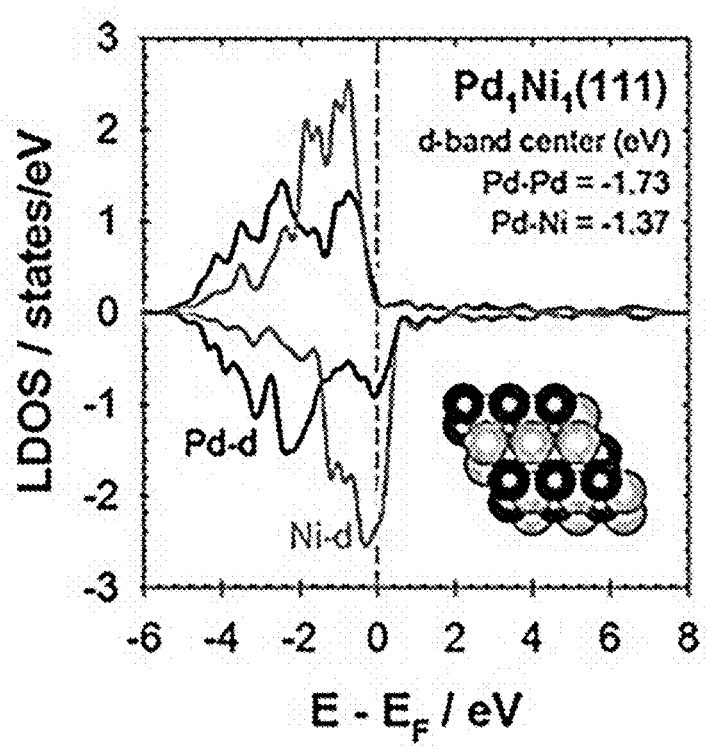
Figure 6D:
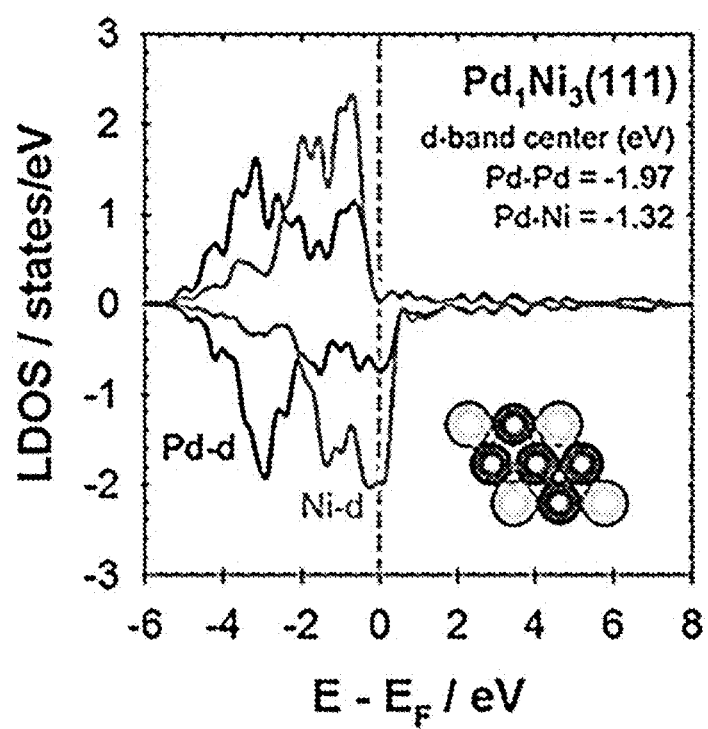

Comparison of Energies of Intermediate and Transition Structure According to Electronic Structure and Reaction Pathway of Catalyst The d-band structures of the catalysts prepared according to Comparative Example 1 and Comparative Examples 1 to 3 are illustrated in FIGS. 6A to 6D. In FIG. 6A, the catalyst prepared according to Comparative Example 1 is described as Pd(111), and the catalysts prepared according to Example 1, Example 2, and Example 3 in FIGS. 6B to 6D are described as $Pd_1Ni_{0.33}(111)$, $Pd_1Ni_1(111)$, and $Pd_1Ni_3(111)$, respectively.

Referring to FIGS. 6A to 6D, it could be confirmed that as the nickel content increased, the d-band center of Pd—Pd of each catalyst was shifted into more negative values. In contrast, it could be confirmed that the d-band center of Pd—Ni was shifted into more positive values. Further, referring to FIG. 6, it could be confirmed that in the case of the $Pd_1Ni_1(111)$ catalyst, Pd and Ni particles were reacted in a larger amount than those in Pd(111), $Pd_1Ni_1(111)$, and $Pd_1Ni_3(111)$, so that the $Pd_1Ni_1(111)$ catalyst was expected to have an optimal catalytic activity.

Figure 7:
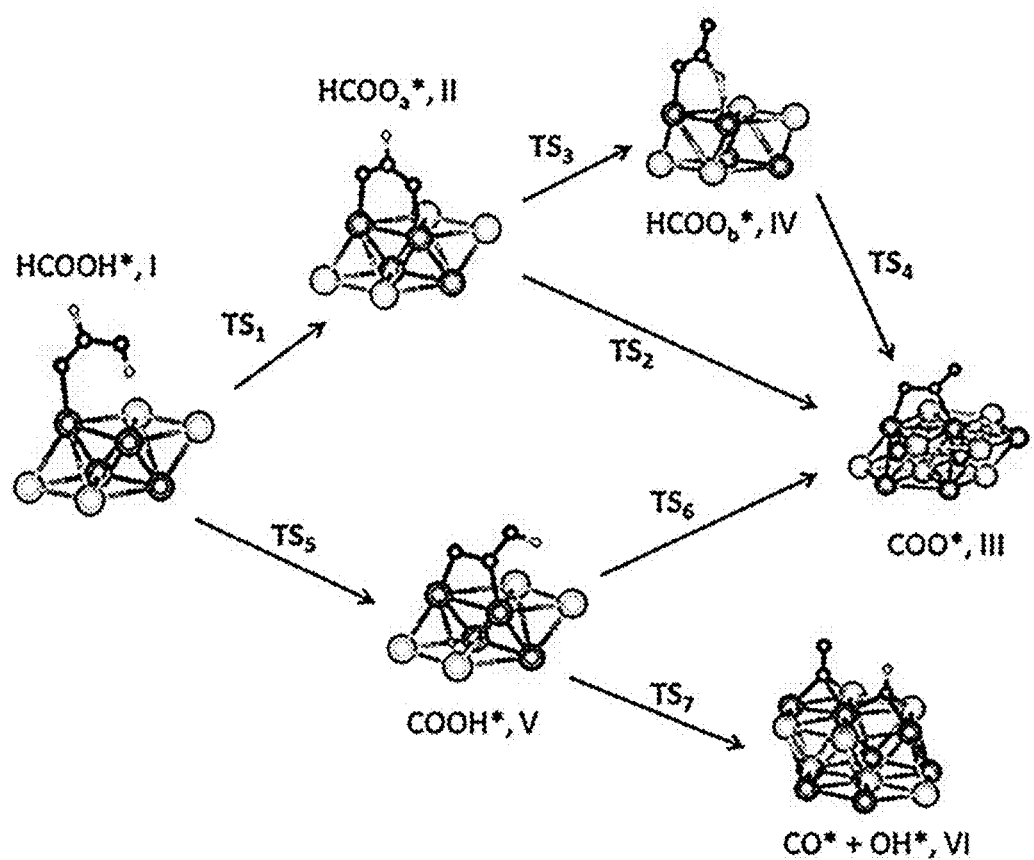
FIG. 7 is a schematic view illustrating a possible reaction pathway of formic acid dehydrogenation reaction when the catalyst prepared according to an aspect of the present disclosure is used.

Further, the energies of the intermediate and the transition state according to the reaction pathway of each catalyst were theoretically calculated. Possible examples of the reaction pathway of formic acid dehydrogenation reaction are illustrated in FIGS. 7, 8A, and 8B, and in FIGS. 8A and 8B, each step of the formic acid dehydrogenation reaction is illustrated as $TS_1$ to $TS_7$ (that is, a relative energy value in each step illustrated in FIG. 7 is measured and illustrated in FIGS. 8A and 8B).

Figure 8A:
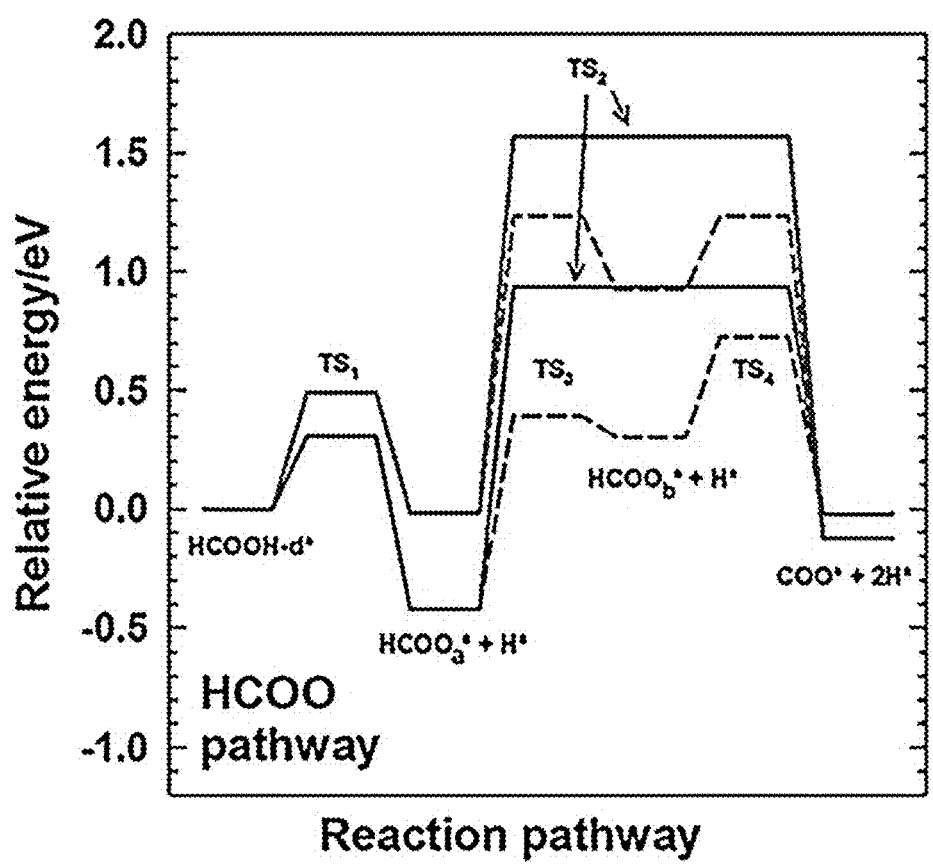
FIGS. 8A and 8B are graphs illustrating the energies of intermediates and transition states of the dehydrogenation reaction of formic acid produced via the reaction pathway explicitly described in FIG. 7 by using the catalysts prepared according to Example 2 and Comparative Example 1.
Figure 8B:
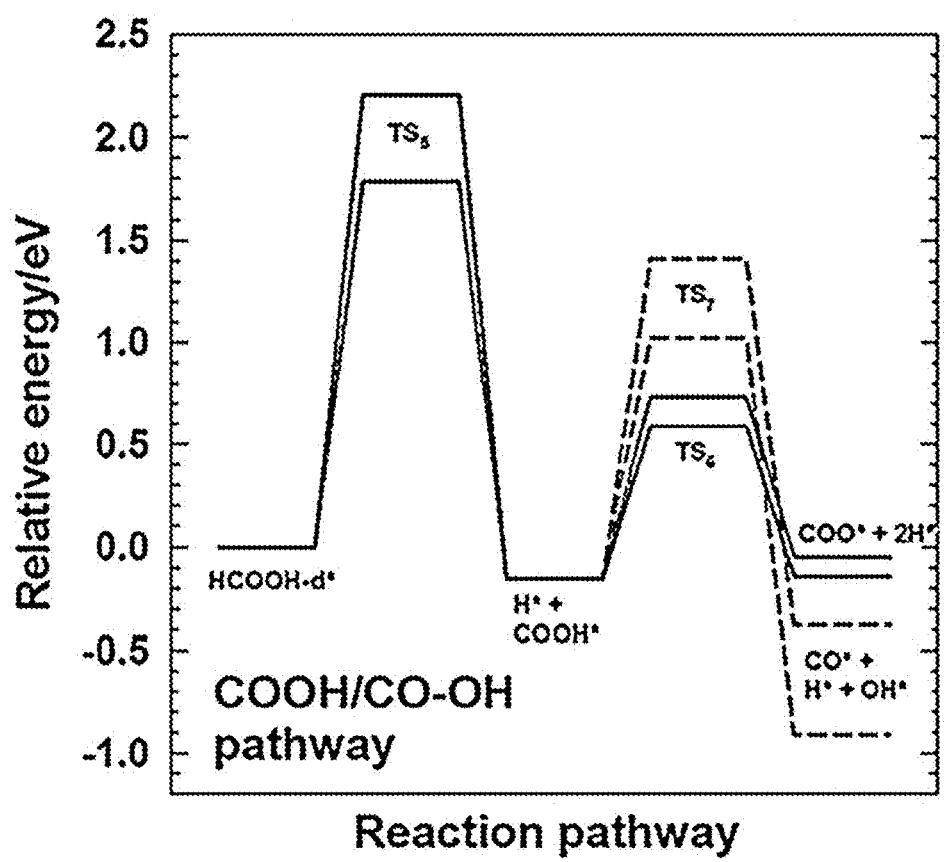

Referring to FIGS. 8A and 8B, it could be confirmed that in almost every reaction step, the activation energy of the catalyst prepared according to Example 2 was low. For example, the reaction pathway described in FIG. 8A is expected to be one of the main reaction pathways due to a low activation energy, and in this case, it could be confirmed that the activation energy of the catalyst prepared according to Example 2 was very low. Accordingly, it could be once again confirmed that when the catalyst prepared according to Example 2 was used, excellent activity and selectivity towards formic acid dehydrogenation reaction were exhibited.

As described above, it could be confirmed that the catalyst of the present disclosure exhibited excellent catalytic activity towards formic acid dehydrogenation reaction through the synergetic effects of a change in electronic characteristics of active sites caused by interaction between metal and support through modification of the support due to nitrogen doping and a change in active site energy through alloying of palladium with other metals. In particular, electronic structural studies using XPS and d-band center calculations mean that catalytic active sites for the dehydrogenation reaction are improved due to interaction between Pd and Ni.

Further, it could be confirmed that the surface of the alloy particle of Pd and Ni increased the catalytic activity by lowering the activation energy along the reaction mechanism of formic acid decomposition reaction, and the alloy particles exhibited excellent catalytic activity towards formic acid dehydrogenation reaction through the synergy of Pd and Ni atomic structures.

The Examples of the present disclosure previously described should not be interpreted to limit the technical spirit of the present disclosure. The scope of the present disclosure to be protected is limited only by the matters described in the claims, and those skilled in the art of the present disclosure can improve and change the technical spirit of the present disclosure in various forms. Therefore, such improvements and changes would fall within the scope of the present disclosure to be protected as long as they are obvious to those skilled in the art.

What is claimed is:

1. A method for preparing a catalyst for a dehydrogenation reaction of formic acid, the method comprising:
   preparing a nitrogen-doped carbon support;
   forming a mixed solution comprising a first aqueous metal precursor solution which comprises palladium (Pd) and a second aqueous metal precursor solution which comprises nickel (Ni); and
   forming a catalyst for a dehydrogenation reaction of formic acid by stirring the nitrogen-doped carbon support with the mixed solution, and then immobilizing alloy particles of Pd and Ni on the nitrogen-doped carbon support.

2. The method according to claim 1, wherein the preparing of the nitrogen-doped carbon support comprises:
   dissolving and stirring dicyandiamide and carbon black in a solvent;
   obtaining carbon black onto which a nitrogen precursor is adsorbed by evaporating the solvent at 50° C. to 150° C.; and
   preparing a nitrogen-doped carbon support by subjecting the obtained carbon black onto which the nitrogen precursor is adsorbed to heat treatment in an inert atmosphere at 400° C. to 700° C.

3. The method according to claim 2, wherein the carbon black comprises at least one selected from the group comprising ketjen-black, vulcan, activated carbon, carbon nanotubes, carbon fibers, fullerene and graphene.

4. The method according to claim 1, wherein a molar ratio of Pd ions to Ni ions in the mixed solution is 1:0.33 to 1:3.

5. The method according to claim 1, wherein the first aqueous metal precursor solution comprises a Pd complex compound coordinated with an organic ligand and the second aqueous metal precursor solution comprises a Ni complex compound coordinated with an organic ligand.

6. The method according to claim 1, wherein the immobilizing of the alloy particles of Pd and Ni on the nitrogen-doped carbon support is performed at 400° C. to 500° C. for 3 to 5 hours.

7. The method according to claim 1, wherein the alloy particles of Pd and Ni have an average particle diameter of 1.0 nm to 3.7 nm.

8. A catalyst for a dehydrogenation reaction of formic acid, comprising alloy particles of Pd and Ni supported on a graphitic carbon nitride support.

9. The catalyst according to claim 8, wherein a molar ratio of Pd to Ni is 1:0.37 to 1:3.6.

10. The catalyst according to claim 8, wherein the alloy particles of Pd and Ni have an average particle diameter of 1.0 nm to 3.7 nm.

* * * * *